Patented July 15, 1941

2,249,330

UNITED STATES PATENT OFFICE 2,249,330

LEAD SULPHATE

Alexander Stewart, Roselle, N. J., assignor to National Lead Company, New York, N. Y., a corporation of New Jersey No Drawing. Application December 6, 1937, Serial No. 178,349

13 Claims. (Cl. 23—127)

This invention relates to a new form of lead sulphate pigment having a particular crystal formation, and unusual covering power as well as other useful properties, and to the process of making such product. The new process falls in the known class of wet or precipitation lead sulphate processes wherein lead oxide is brought into solution by the effect of an acetic or nitric ion and the lead sulphate is precipitated by the introduction of sulphuric acid. It differs from prior proposals in respect to the manner of effecting the sulphation of the lead slurry, this being so carried on as to produce an orderly succession of chemical reactions, resulting in a precipitated sulphate which contains a large proportion of acicular or needle-like crystals, quite distinct from the crystal formation of lead sulphates heretofore known to the art.

By virtue of this crystal formation the pigment is much superior to present commercial forms, notwithstanding that its chemical composition may be the same. Its particular points of superiority are, first, its hiding power, of greatest importance in the paint industry, which is equivalent per pound to at least 1.25 to 1.33 pounds of ordinary basic lead sulphate now available to the trade. Next, its paint thickening property which is a measure of its keeping and brushing quality and is shown in the following table comparing paint consistencies at different pigment concentrations (as determined by the Gardner mobilometer, using a 120 gram plunger at 70° F.):

| Percent pigment by weight linseed oil paint | Time in seconds for plunger drop: middle 10 cm. | |
| --- | --- | --- |
|  | New product | Sublimed product (commercial) |
| 55.0 | 14 | 5 |
| 60.0 | 23 | 8 |
| 62.5 | 33 | 9 |
| 66.0 | 95 | 13 |

In the foregoing it will be seen that the new product requires only 55% by weight, as compared to 66% by weight of the commercial product, to produce the same consistency value. Again, ordinary basic lead sulphate, packed in ordinary tin cans in the form of a paste with linseed oil, hardened and livered in approximately three to four months, whereas the new product has not hardened or livered in a test of over one year.

According to this invention a slurry is made of lead oxide PbO or finely divided lead or a mixture of both in water containing a small amount of a catalyzer such as acetic acid or nitric acid and is blown with air through port holes entering the bottom of the container for the purpose of oxidizing any metallic lead that may be present and thereafter maintaining a vigorous agitation. The agitation by air is desirably supplemented by a mechanical agitator such as motor-driven paddle wheel of the turbine type submerged in the container.

With the slurry between 60 and 95° C. and preferably at about 80° C. sulphuric acid is added in three stages, which stages may however follow the one directly after the other without interruption. In the first stage it is added at such rate or in such quantity as to convert all of the solid phase of the slurry into the form of hydrated tribasic lead sulphate ($PbSO_4.3PbO.H_2O$) as determined after filtering, washing and drying at 105° C. And no more acid is added or allowed to be present during this stage than will be sufficient to accomplish that result, which will be obtained in about one and one-half hours.

After this stage has been reached and during the second stage the acid is introduced slowly and preferably at a uniform rate and until the whole of the solid phase (tribasic sulphate) of the first stage has been converted to the form of anhydrous monobasic sulphate ($PbSO_4.PbO$), no more acid being admitted or allowed to be present at any time than will suffice to carry this second stage conversion to completion, i. e. all to monobasic form. The amount of acid introduced is however sufficient to carry the liquid phase of the slurry over to the acid side so that at the end of the second stage the solution is acid in character turning litmus paper red.

After all of the solid phase has thus been converted to monobasic form the latter will be found to consist of acicular crystals and has certain practical value as a pigment and can be sold as such, but for some purposes is less desirable than the product of the third stage which preferably immediately follows but which must not begin until all of the solid phase of the second stage has become completely monobasic. During the third stage acid addition is continued slowly and preferably at a uniform rate until such an amount has been added as, by previous calculation, will suffice to produce a product approximately of equimolecular proportions of monobasic lead sulphate and normal lead sulphate and represented empirically by the formula $2PbSO_4.PbO$, the slurry during the whole of this third stage continuing to remain on the acid side. This product will be 63.5% monobasic and 36.5% normal but the reaction can be continued to produce a proportion of as little as 40% monobasic and 60% normal sulphate within this invention. In any event the product will contain a relatively large and generally predominating proportion of acicular crystals.

When diluted sulphuric acid (approximating

33%) is slowly dropped into a slurry containing lead oxide (PbO) and a small amount of the acetate ion at a constant temperature, the liquid phase being saturated with respect to the oxide, there occurs a transformation or precipitation of a portion of the dissolved lead oxide into the insoluble compound above referred to as hydrated tribasic lead sulphate. Due to the presence of the acetate ions and the relatively slow rate of addition of the sulphuric acid, the liquid phase is rapidly restored to its saturation value at the particular operating temperature. Further addition of sulphuric acid increases the amount of this hydrated tribasic lead sulphate, the liquid being constantly resaturated with lead oxide PbO as the process continues until all of the uncombined lead has been converted to the tribasic form. At the point where this has occurred and the lead oxide is completely transformed, which point may be recognized, without analysis, by an increase in the electrical resistance of the slurry over its initial value, the solid phase turns from the yellow color of litharge to a snow white and then consists substantially of the above mentioned hydrated tribasic lead sulphate. This product, which is the most basic sulphate produced under these conditions, shows the following chemical composition after drying at 105° C.

|  | Percent |  | Percent |
|---|---|---|---|
| Total lead oxide (PbO) | 90.1 | Lead sulphate (PbSO₄) | 30.6 |
| Total sulphur trioxide (SO₃) | 8.1 | Hydrated lead oxide (3PbO.H₂O) | 69.4 |
| Combined water (H₂O) | 1.8 | | |
| | 100.0 | | 100.0 |

This product consists of large well-defined, lamellar, elongated crystals and is produced in a basic lead acetate solution containing lead oxide and the acetate ion substantially in the molar ratio of 7:4. This solution has a pH value of about 9.3 as measured at 25° C. The reaction may be written $$4PbO + H_2SO_4 = PbSO_4.3PbO.H_2O$$

While the rate of acid introduction during the first stage is of no particular consequence, provided more than necessary to produce the tribasic sulphate is not introduced and the basicity of the solution phase is maintained, it is desirable in the second and third stages that the acid be introduced slowly and over a period, for both stages, approximating three and one-half to four and one-half hours, the total time for the process being around five to six hours, depending upon plant operation. For the second stage, a calculated amount of acid is admitted sufficient to convert the solid phase of the first stage (tribasic lead sulphate) into monobasic lead sulphate as represented by the following equation $$PbSO_4.3PbO.H_2O + H_2SO_4 = 2(PbSO_4.PbO) + 2H_2O$$

The progress of this reaction which takes place in a basic lead acetate solution containing PbO and the acetate ion substantially in the molar ratio of 4:3 (corresponding to the pH value of about 7.8 at 25° C. but dropping to about 6.3 at the conclusion of this stage) is attended by constant thickening of the slurry, indicating a constant change in the physical structure of the solid phases. The end point of this second stage reaction is manifested by a second increase of about 30% of the previous electrical resistance of the slurry. The resulting solid phase which is insoluble under the prevailing conditions, shows a composition equivalent to anhydrous mono- basic lead sulphate, on drying at 105° C. as follows:

|  | Percent |  | Percent |
|---|---|---|---|
| Total lead oxide (PbO) | 84.8 | Lead sulphate (PbSO₄) | 57.6 |
| Total sulphur trioxide (SO₃) | 15.2 | Lead oxide (PbO) | 42.4 |
| | 100.0 | | 100.0 |

This resulting solid phase is constituted of long, well-defined acicular monoclinic crystals which have eventuated from the large lamellar crystals of the first stage product and which condition appears to govern the crystal characteristics of the subsequent ultimate product of this invention.

The third stage of the process performs the function of so uniting or assembling the said monobasic and normal lead sulphate molecules as to produce crystals which represent either a coalescence of the two substances, a solid solution of one in the other, or a product of adsorption, this being the result of the partial neutralization of the acicular monobasic sulphate of the second stage occurring in a normal lead acetate solution having a pH value approximating 6.3 at 25° C. and within the temperature range above stated viz. 60–95° C.

The distinctly crystalline, white, substantially insoluble product of the third stage, conforming to the proximate empirical composition 2PbSO₄.PbO, cannot be regarded as a definite chemical compound, as may be proved by the phase relations involved in its formation as well as by X-ray analysis, refractive index, specific gravity, and microscopic examination. Nor can it be regarded as an ordinary mechanical mixture. X-ray analysis by the powder method using a cylindrical vacuum camera, rotating the specimen continuously during exposure to a narrow beam of X-rays coming from a high intensity copper target X-ray tube, shows a spectrogram indicative of a true compound for the composition, monobasic lead sulphate, PbSO₄.PbO. The interplanar spacings, particularly six of these spacings, are definitely characteristic of this material. The diffraction pattern for the product of this invention shows a displacement in the spectral lines indicative of solid solution, which is or characterizes a mixed crystal. Not only is there microscopic evidence of homogeneous crystals acicular instructure, but diffraction pattern reveals a definite shift in the interplanar spacings of the components, monobasic lead sulphate, PbSO₄.PbO, and normal lead sulphate, PbSO₄, which is all indicative of solid solution.

The relation of the refractive indices of the products of the several stages above discussed, to normal sulphate, is indicated as follows:

| | Average refractive index |
|---|---|
| Tribasic lead sulphate (PbSO₄.3PbO.H₂O) | 2.1 |
| Monobasic lead sulphate (PbSO₄.PbO) | 2.02 |
| (Equimolecular proportions of monobasic and normal lead sulphate (PbSO₄.PbO— PbSO₄) | 2.0) |
| Normal lead sulphate (PbSO₄) | 1.89 |

The above indicates that the normal, monobasic, and tribasic lead sulphates are entirely different compounds. The monobasic and equimolecular proportions of monobasic and normal lead sulphate have refractive indices that are very close together, suggesting that the monobasic has formed or grown into a mixed crystal or solid solution with normal lead sulphate, in the proportions described. The microscope yields sufficient evidence that the equimolecular proportions of monobasic and normal lead sulphate, or the product of the third stage of this process, is not a mechanical mixture. Moreover, the approximate equimolecular proportion of monobasic and normal lead sulphate shows a strong birefringence of the particles that could not be normal lead sulphate and establishes the product as not a mechanical mixture. This condition persisted to a composition approximating 70% normal lead sulphate and 30% monobasic lead sulphate, indicating that the monobasic lead sulphate crystal tends to control the crystal form of the third stage product and must pick up normal lead sulphate.

Microscopically, the percentage by weight of acicular crystals present, in varying proportions, in the several products, is approximately as follows:

| Approximate composition | Percent acicular crystals |
| --- | --- |
| Monobasic lead sulphate, 100% (2d stage product) | 95 |
| Monobasic lead sulphate, 80%—normal lead sulphate, 20% | 80 |
| Monobasic lead sulphate, 63%—normal lead sulphate, 37% | 80 |
| Monobasic lead sulphate, 59%—normal lead sulphate, 41% | 70 |
| Monobasic lead sulphate, 40%—normal lead sulphate, 60% | 50 |
| Monobasic lead sulphate, 20%—normal lead sulphate, 80% | 10 |
| Substantially none, 0%—normal lead sulphate, 100% | 3 |

Investigation of the specific gravity of products resulting from the partial neutralization of monobasic lead sulphate with sulphuric acid revealed a direct proportion between the percentage of normal lead sulphate and specific gravity, i. e., a decrease in specific gravity with increased normal lead sulphate content. I have found that the products of the second and third stages have a specific gravity within the range 6.54 to 6.91.

The process according to this invention is conducted in its preferred embodiment over a five to six hour period within the temperature range of 60–95° C. The acetate ion—lead oxide (PbO), or finely divided lead (Pb), and water ratios may vary over wide limits, depending on the character of the lead oxide or the finely divided lead used. I have found, however, that the proportion, 1:60:520, is generally satisfactory, although I do not confine myself thereto. As an example of commercial procedure, there is added to a wooden tank containing about 2,000 gallons of water, approximately 1920 pounds of finely divided lead oxide PbO or metal Pb, or both, and approximately 40 pounds of 70% acetic acid. Air is blown through the slurry via port holes in the tank bottom and the aerated slurry is agitated also by a stirrer at a temperature of 70–80° C. The sulphuric acid needed for the first stage will be 61.5 gallons, for the second 61.5 gallons, and for the third 41 gallons, total 164 gallons of 33% acid. It is run in slowly and uniformly from stage to stage and over a total period approximating, as stated, about six hours. The amount for the first stage is ordinarily admitted relatively quickly and through a larger orifice, which is partially closed or substituted by a smaller one for the next following stages. The pulp is desirably agitated a short time before filtration. The filtrate will contain substantially all of the acetate radical charged and may be recycled. The filter cake is dried in any appropriate type of dryer and without any necessary grinding or classification treatment is at once ready for the market.

While the foregoing example gives a product indicating a proximate composition of 73% lead sulphate and 27% lead oxide (PbO), I do not of course confine myself to this proportion, my investigations having shown that the total lead sulphate content of the product may vary between 57% and 83% without impairing the valuable pigmentary properties due to the large proportion of acicular crystals.

When the total lead sulphate is 57.6% the product is wholly monobasic acicular lead sulphate, the product of the second stage; when it is 73.1%, which is the equimolecular proportion, the acicular product is approximately 63% monobasic lead sulphate and 37% normal lead sulphate; when it is 83%, the product is 40% monobasic lead sulphate and 60% normal lead sulphate, and when it is 66% the product is 80% monobasic lead sulphate and 20% normal lead sulphate. The exceptional pigmentary properties resulting from the crystal coalescence of the third stage are particularly manifested in the equimolecular product, but also to an advantageous degree in other third stage products in the range between 66% and 83% total lead sulphate. In all cases the particle size, as measured by surface mean, may be assumed to be not particularly different from the commercial (sublimed) sulphate. The superior properties of this product are positively indicated to be the result of the acicular formation of the particles, which approximate an average diameter, by surface mean, of 1.2 microns.

I claim:

1. In the method of making basic lead sulphate by reacting with sulphuric acid on a slurry of lead oxide, containing a sulphation-promoting catalyst, the improvement which consists in regulating the admission of the acid so that all of the solid phase of the slurry is successively converted to tribasic lead sulphate and monobasic sulphate, under a reaction temperature of between 60° and about 95° C.

2. The process of making basic lead sulphate of high pigmentary value which comprises preparing a slurry of lead oxide containing a sulphation-promoting catalyst, subjecting the slurry to agitation and a temperature of not substantially less than 60° C. nor more than 95° C., admitting sulphuric acid thereinto in such amount and rate that the solid phase becomes substantially wholly converted into and constituted of tribasic lead sulphate, then feeding further sulphuric acid until such solid phase becomes substantially wholly converted into and constituted of monobasic lead sulphate, thereafter continuing said acid feeding under agitation and heat, and ceasing this feeding when more than about 20% and less than about 60% of normal lead sulphate has been produced in said solid phase.

3. The process of making improved basic lead sulphate which comprises preparing a slurry of lead oxide containing a sulphation-promoting catalyst, subjecting the slurry to agitation and a temperature of not substantially less than 60° C. nor more than 95° C., admitting sulphuric acid thereinto in such amount that the solid phase becomes substantially wholly converted into and constituted of tribasic lead sulphate, then feeding further sulphuric acid until such solid phase becomes substantially wholly converted into and constituted of monobasic lead sulphate, thereafter continuing said acid feeding under agitation and heat, and ceasing such admission when about 37% or normal lead sulphate has been produced in said solid phase.

4. The process of making improved basic lead sulphate which comprises preparing a slurry of lead oxide containing a sulphation-promoting catalyst, subjecting the slurry to agitation by air-blowing and to a temperature of not less than 60° C. nor more than 95° C., admitting sulphuric acid thereinto in such amount that the solid phase becomes substantially wholly converted into and constituted of tribasic lead sulphate, then admitting further sulphuric acid until such solid phase becomes substantially wholly converted into and constituted of monobasic lead sulphate, thereafter continuing said acid admission, air blowing and heat, and ceasing the acid admission when more than about 20% and less than about 60% of normal lead sulphate has been produced in said solid phase.

5. The process of making improved basic lead sulphate which comprises preparing a slurry of lead oxide in the relative proportions of 60 lbs. lead oxide to about 520 pounds of water and containing a sulphation-promoting catalyst, subjecting such slurry to air-blast agitation and mechanical stirring and to a temperature of not less than about 60° C., admitting sulphuric acid thereinto at such rate and amount that the solid phase becomes substantially wholly converted into and constituted of tribasic lead sulphate, then admitting further sulphuric acid until such solid phase becomes substantially wholly converted into and constituted of coalesced crystals of monobasic and normal lead sulphate.

6. The process of making tribasic lead sulphate which comprises preparing a slurry of lead oxide containing a sulphation-promoting catalyst, and subjecting it to agitation and a temperature of 60° C. to 95° C., and admitting sulphuric acid thereto in amount not exceeding the ratio of about 61.5 gallons of approximately 33% acid to 1920 pounds of lead oxide.

7. The process of making monobasic lead sulphate which comprises preparing a slurry of lead oxide containing a sulphation-promoting catalyst, agitating it and heating it to a temperature of about 60° C. to 95° C., introducing sulphuric acid into such slurry in amount not exceeding the proportion of about 65.5 gallons of approximately 33% acid to 1920 pounds of lead oxide and continuing the agitation until the solid phase becomes wholly constituted of tribasic lead sulphate and then introducing more sulphuric acid not exceeding the same proportion until the whole of the solid phase becomes converted to monobasic lead sulphate.

8. The process of making improved basic lead sulphate pigment which comprises preparing a slurry of lead oxide in water containing a sulphation-promoting catalyzer and maintaining such slurry at a temperature above room temperature and in constant agitation, introducing sulphuric acid into such heated and agitated slurry in amount enough to convert all the oxide into hydrated tribasic lead sulphate and continuing the agitation and heat until a first increase in electrical resistance of the liquid phase has occurred, then introducing more sulphuric acid in amount not more than will convert all said tribasic sulphate to monobasic sulphate and continuing this introduction over a period of about two hours under the same condition of agitation, the temperature being at least about 60° C., until a second increase in electrical resistance of the liquid phase has occurred, the pH value then dropping to about 6.3.

9. The process of the preceding claim in which following the second increase of electrical resistance, further sulphuric acid is introduced under the same conditions of heat and agitation until some normal lead sulphate has been formed, not exceeding about 37%, and has coalesced with the monobasic sulphate forming a product composed mainly of acicular crystals.

10. The process of making basic lead sulphate pigment which consists in introducing sulphuric acid, in such amount and rate, into a slurry of lead oxide containing sulphation-promoting ions, while such slurry is being vigorously agitated, until the whole of the solid phase thereof is converted to hydrated tribasic lead sulphate at one time, said phase then containing no free lead oxide nor any other form of lead sulphate, and when this condition has been ascertained to exist, continuing the acid introduction under like condition of agitation until the whole of the solid phase is converted into monobasic lead sulphate at one time, containing no free lead oxide or other form of lead sulphate, and separating such solid phase as the product.

11. The process of the preceding claim in which the acid introduction is continued further and until said wholly monobasic phase becomes partially converted to normal lead sulphate and contains not more than about 37% of such normal sulphate.

12. The process of making basic lead sulphate pigment which consists in agitating a slurry of lead oxide containing sulphation-promoting ions by blowing air into it and coincidently introducing sulphuric acid into such slurry in such amount and rate to convert the whole of the solid phase thereof into hydrated tribasic lead sulphate at one time, said solid phase then containing no free lead oxide nor any other form of lead sulphate and, when this condition has been ascertained to exist, continuing the acid introduction under like conditions of agitation until the whole of the solid phase is converted into monobasic lead sulphate at one time, containing no free lead oxide or other form of lead sulphate, and separating such solid phase as the product.

13. Basic lead sulphate produced by the process set forth in claim 2, having the formula $2PbSO_4 \cdot PbO$ and characterized by its pure white color and freedom from tribasic lead sulphate.

ALEXANDER STEWART.

CERTIFICATE OF CORRECTION.

Patent No. 2,249,330. July 15, 1941.

ALEXANDER STEWART.

It is hereby certified that error appears in the printed specification of the above numbered patent requiring correction as follows: Page 4, first column, line 4, claim 3, for the word "or" read --of--; and that the said Letters Patent should be read with this correction therein that the same may conform to the record of the case in the Patent Office.

Signed and sealed this 7th day of October, A. D. 1941.

(Seal)

Henry Van Arsdale,
Acting Commissioner of Patents.